US009612811B2

(12) United States Patent
Sabne et al.

(10) Patent No.: US 9,612,811 B2
(45) Date of Patent: Apr. 4, 2017

(54) CONFLUENCE ANALYSIS AND LOOP FAST-FORWARDING FOR IMPROVING SIMD EXECUTION EFFICIENCY

(71) Applicant: NVIDIA CORPORATION, Santa Clara, CA (US)

(72) Inventors: Amit Jayant Sabne, West Lafayette, IN (US); Yuan Lin, Cupertino, CA (US); Vinod Grover, Mercer Island, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/160,426

(22) Filed: Jan. 21, 2014

(65) Prior Publication Data
US 2015/0205590 A1    Jul. 23, 2015

(51) Int. Cl.
    *G06F 9/45*    (2006.01)
(52) U.S. Cl.
    CPC ............ *G06F 8/456* (2013.01); *G06F 8/4452* (2013.01); *G06F 8/443* (2013.01)
(58) Field of Classification Search
    None
    See application file for complete search history.

(56) References Cited

U.S. PATENT DOCUMENTS

| | | | |
|---|---|---|---|
| 7,684,971 B1 * | 3/2010 | Larsson et al. | 703/22 |
| 8,381,203 B1 * | 2/2013 | Beylin | G06F 8/458 717/149 |
| 2002/0049955 A1 * | 4/2002 | Yamashita | G06F 17/505 716/102 |
| 2009/0259996 A1 * | 10/2009 | Grover et al. | 717/136 |
| 2009/0259997 A1 * | 10/2009 | Grover et al. | 717/136 |
| 2011/0219221 A1 * | 9/2011 | Skadron et al. | 712/235 |
| 2012/0204014 A1 * | 8/2012 | Leather et al. | 712/223 |
| 2014/0215183 A1 * | 7/2014 | Yazdani | G06F 9/3851 712/24 |
| 2015/0135182 A1 * | 5/2015 | Liland | G06F 9/3867 718/102 |

OTHER PUBLICATIONS

"Control Flow Optimization via Dynamic Reconvergence Prediction", Collins, published in 37th International Symposium on Microarchitecture, Dec. 2004.*
"SIMD Re-Convergence at Thread Frontiers", Diamos et al., Micro'11, Dec. 3-7, 2011.*

* cited by examiner

*Primary Examiner* — Daxin Wu
(74) *Attorney, Agent, or Firm* — Artegis Law Group, LLP

(57) ABSTRACT

One embodiment of the present invention sets forth a method for causing thread convergence. The method includes determining that a control flow graph representing a first section of a program includes at least two non-overlapping paths that extend from a first divergent node to a candidate node. The method also includes determining that the first divergent node is not a dominator of the candidate node or that the candidate node is not a post-dominator of the first divergent node. The method further includes identifying an external node and inserting a first instruction configured to cause a predicate variable to be set to true for a first set of threads that is to execute the external node. The method additionally includes inserting into the program a second divergent node configured to cause various threads to execute or not execute a first control flow path associated with the external node.

20 Claims, 14 Drawing Sheets

| | T1 | T2 | T3 | T4 |
|---|---|---|---|---|
| 3 | E | - | - | - |
| 4 | E | - | - | - |
| Entry | - | E | E | E |
| 1 | - | E | E | - |
| 3 | - | E | E | - |
| 4 | - | E | E | - |
| 2 | - | - | - | E |
| 4 | - | - | - | E |

US 9,612,811 B2

CONFLUENCE ANALYSIS AND LOOP FAST-FORWARDING FOR IMPROVING SIMD EXECUTION EFFICIENCY

BACKGROUND OF THE INVENTION

Field of the Invention

Embodiments of the present invention relate generally to compute processing and, more specifically, to confluence analysis and loop fast-forwarding for improving SIMD execution efficiency.

Description of the Related Art

Under a single-instruction-multiple-data (SIMD) processing model, a processor processes a single instruction across multiple items of data. Multiple execution units typically exist in a SIMD processor, each of which executes a different thread associated with a different data item. During execution the multiple threads may "diverge" when, for example, the threads encounter a conditional branch instruction. The condition of such a branch may be based on thread-specific data, in which case some threads may evaluate the branch condition in one way and other threads evaluate the condition in a different way. Because of the SIMD nature of the processor these different control flow paths are oftentimes executed at different times. When threads execute different control flow paths in this manner, the threads are said to be "divergent." As a general matter, SIMD processors experience higher processing efficiency when the threads do not diverge, as more data is processed simultaneously in such instances.

Several techniques exist for causing threads that have diverged to reconverge. One common technique is referred to as immediate-post-dominator reconvergence ("IPDOM reconvergence"). In this approach, threads that diverge between a dominator and an immediate-post-dominator are caused to reconverge when all threads arrive at the immediate-post-dominator. A first node is a dominator of a second node if a thread that executes the second node also executes the first node. A first node is a post-dominator of a second node if a thread that executes the first node also executes the second node. A first node is an immediate-post-dominator of a second node if the first node post-dominates the second node and does not post-dominate any other post-dominators of the second node. Threads can be caused to reconverge in this situation because all threads that execute the dominator must also execute the post-dominator.

One drawback to IPDOM reconvergence is that IPDOM reconvergence is usually applicable only when a dominator/immediate-post-dominator pair exists. However, in many divergent thread processing scenarios where thread reconvergence is desired, such a node pair does not exist.

As the foregoing illustrates, what is needed in the art is a more effective technique for causing divergent threads to reconverge in parallel execution environments.

SUMMARY OF THE INVENTION

One embodiment of the present invention sets forth a method for causing thread convergence. The method includes determining that a control flow graph representing a first section of a program includes at least two non-overlapping paths that extend from a first divergent node to a candidate node. The method also includes determining that the first divergent node is not a dominator of the candidate node or that the candidate node is not a post-dominator of the first divergent node. The method further includes identifying an external node and inserting a first instruction configured to cause a predicate variable to be set to true for a first set of threads that is to execute the external node. The method additionally includes inserting into the program a second divergent node configured to cause various threads to execute or not execute a first control flow path associated with the external node.

One advantage of the disclosed technique is that the approach allows a dominator/immediate-post-dominator pair to be created in situations in which such a pair does not exist. Creating this pair allows IPDOM reconvergence to be applied, which causes threads to reconverge at the post-dominator. Causing threads to reconverge at the post-dominator reduces the number of times that a candidate node is executed, which can reduce overall processing time, thereby improving performance. Another advantage is that the approach allows loop execution time to be reduced by allowing threads to execute a body within a divergent execution path in the loop to be executed fewer times than without loop fast-forwarding. Reducing the number of times this body executes reduces execution time of the loop, which improves processing performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
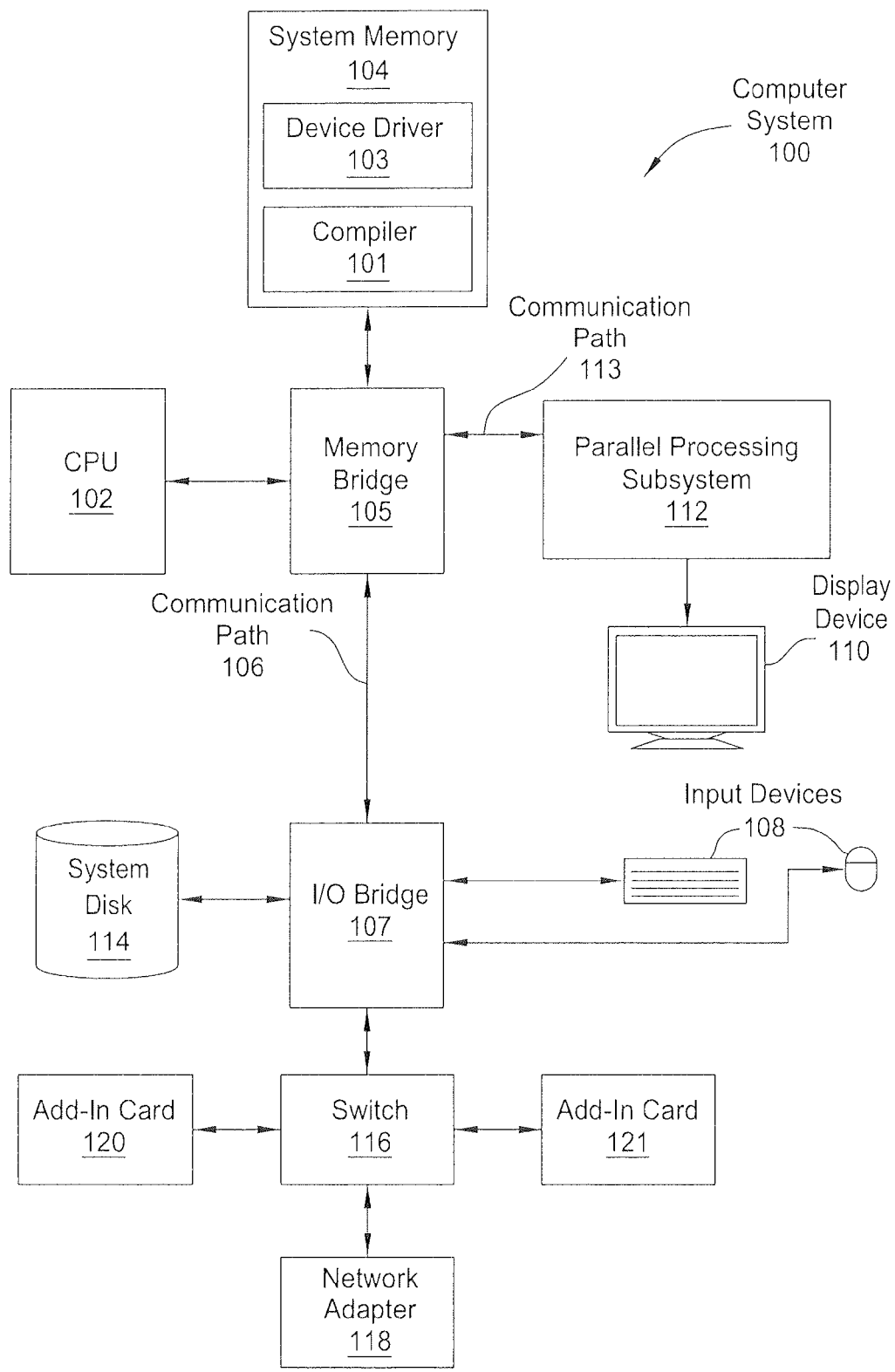
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 is part of a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. System memory also includes a compiler 101 configured to compile code from one format to another, for execution by a processing system such as parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
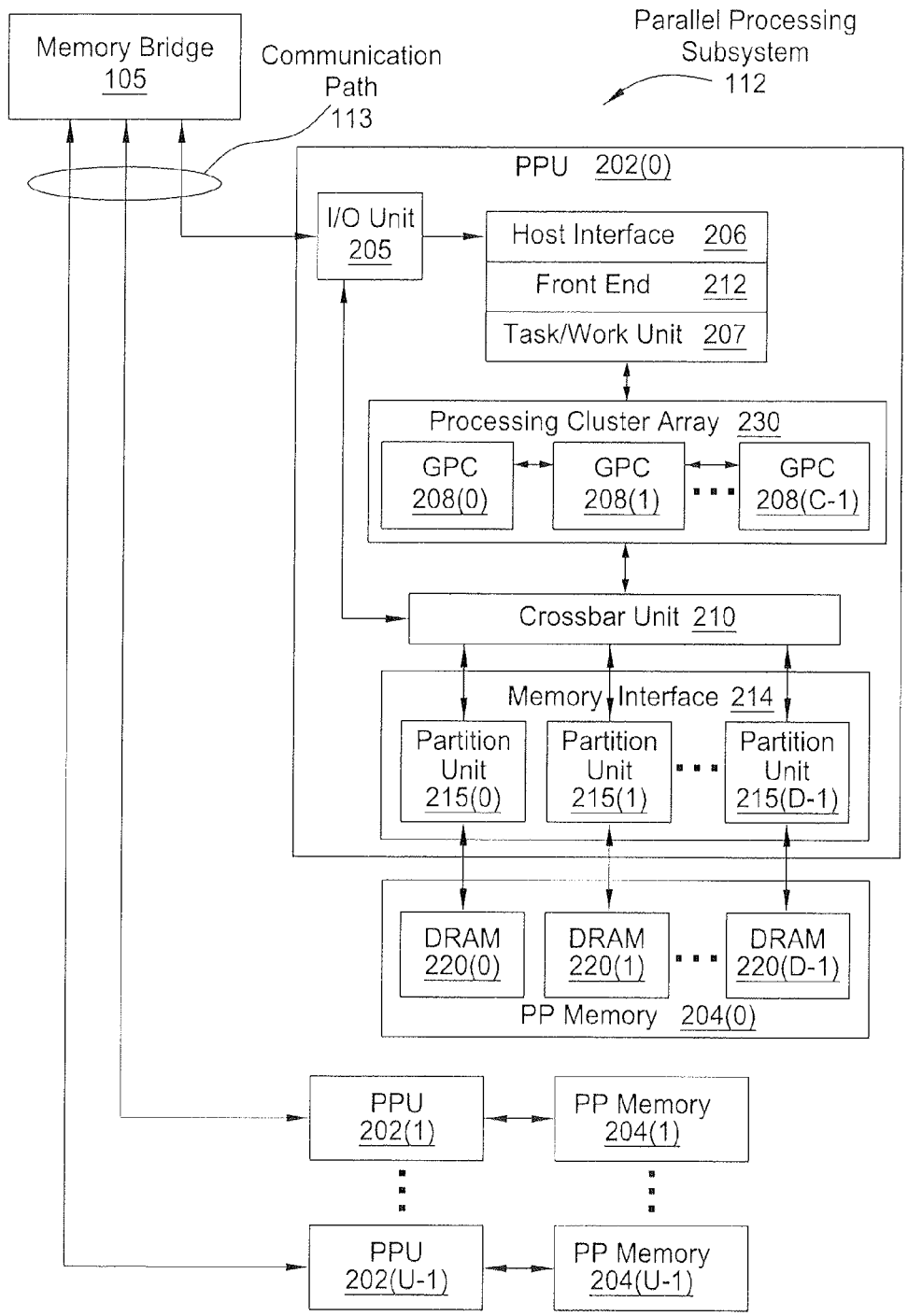
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
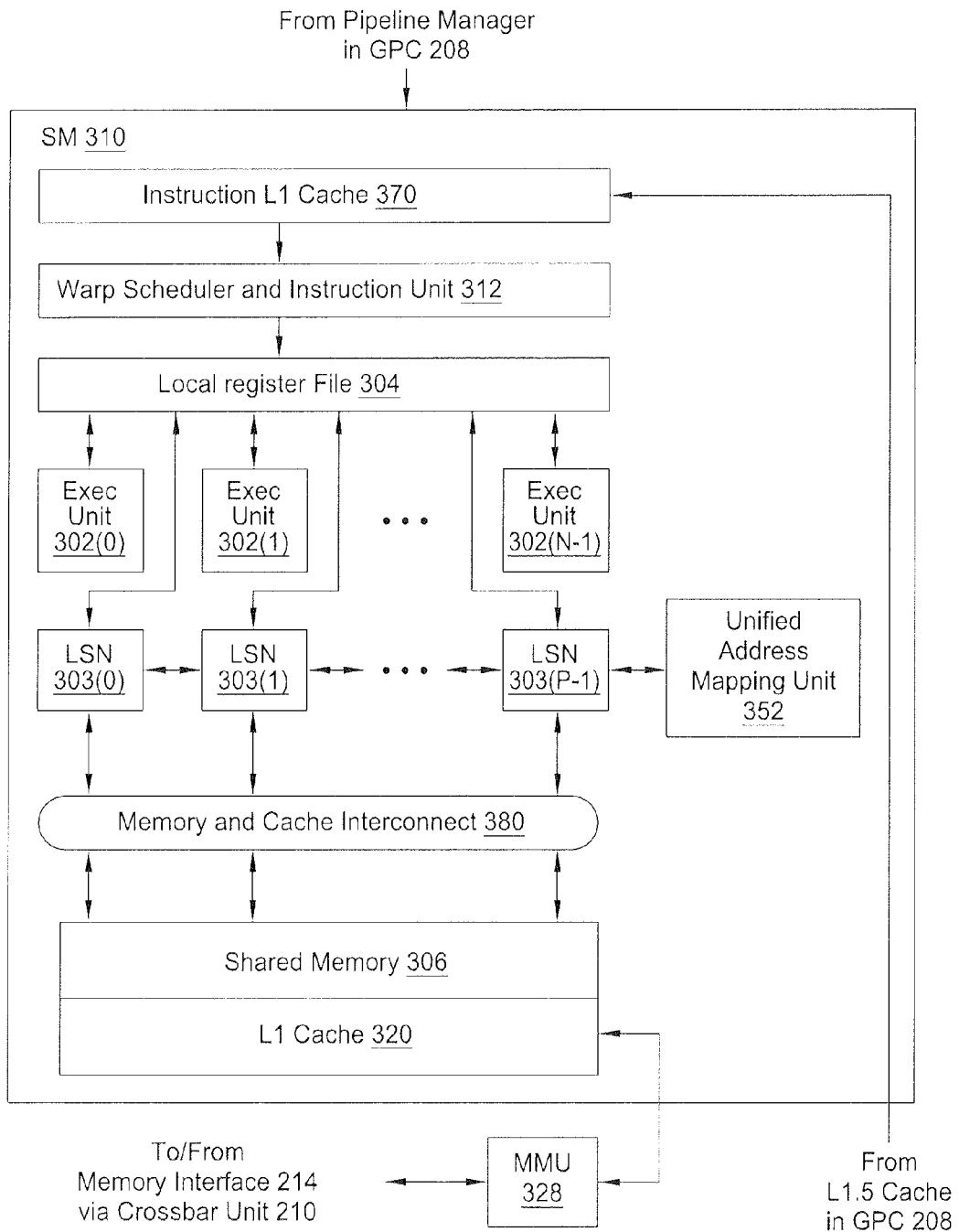
FIG. 3 is a block diagram of a general processing cluster included in the parallel processing unit of FIG. 2, according to one embodiment of the present invention.

FIG. 3 is a block diagram of a streaming multiprocessor (SM) 310 included within a GPU 208 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager (not shown) that distributes processing tasks to one or more streaming multiprocessors (SMs) 310, where each SM 310 is configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Techniques for Improving SIMD Execution Efficiency

As described above, SM 310, which executes under a single-instruction-multiple-data (SIMD) processing model, executes a single instruction with multiple items of data. More specifically, each execution unit 302 executes the same instruction at the same time, but may execute such instruction on different data items. Each execution unit 302 in SM 310 executes a different thread from the other execution units 302 in SM 310. A thread is a logical construct that executes a particular control flow path. At any time, a thread may be active, in which case the thread is actively executing the instructions, or inactive, in which case the thread is not actively executing the instructions.

In some instances, control flow of a program may be divergent. "Control flow" refers to the sequence of instructions executed by the execution units 302 in SM 310. Divergent control flow refers to a situation in which different threads executing in SM 310 execute different sequences of instructions. Such a situation may arise when a conditional branch occurs. A conditional branch is an instruction that jumps to different locations within a program depending on a condition that is specified by the conditional branch. That condition may be evaluated based on variable data that may be different for each thread. Because threads executing in SM 310 may execute instructions on different data items, a conditional branch may cause different threads to "diverge" and execute different sequences of instructions. As described above, however, at any given time, each execution unit 302 in SM 310 executes the same instruction as each other execution unit 302 in the SM 310. In order to accommodate divergent control flow, therefore, the SM 310 "serializes" the control flow paths that the different threads take. Serialization of control flow paths means executing different control flow paths at different times, where each control flow path is executed only for the threads that take that control flow path. For example, if a first set of threads diverges from a second set of threads, then the first set of threads executes a first control flow path, and then a second set of threads executes a second control flow path.

While an SM 310 is executing a divergent control flow path, with some threads executing the control flow path and other threads not executing the control flow path, the execution units 302 for the set of threads that are not executing the control flow path are disabled. Thus, while SM 310 is executing a divergent control flow path, the full processing capability of the SM 310 is not being leveraged. In many instances, a certain amount of such inefficiency is not avoidable. However, if execution of threads becomes "too divergent," then processing performance may suffer. In an extreme example, the SM 310 may serialize execution for every single thread, which effectively negates the processing benefits associated with SIMD-based processing.

On technique commonly implemented to increase the number of threads that execute at the same time is a technique referred to herein as immediate post-dominator reconvergence (IPDOM reconvergence). IPDOM reconvergence is a compiler optimization mechanism that also relies on related IPDOM reconvergence instructions supported by the SM 310. Generally speaking, compilers, such as compiler 101, analyze computer code with respect to a control flow graph that includes a number of nodes. A node is a segment of code for which all threads that enter the node also exit the node.

To perform an IPDOM reconvergence optimization, compiler 101 analyzing a sequence of code looks for a dominator/immediate post-dominator pair. A dominator is a node that is said to "dominate" another node. A first node is a dominator of a second node if a thread that executes the second node also executes the first node. A post-dominator is a node that is said to "post-dominate" another node. A first node is a post-dominator of a second node if a thread that executes the first node also executes the second node. A first node is an immediate-post-dominator of a second node if the first node post-dominates the second node and does not post-dominate any other post-dominators of the second node. A dominator/immediate-post-dominator pair is a pair of nodes that includes both a dominator and an immediate-post-dominator, where the immediate-post dominator dominates the dominator. Dominator/immediate-post-dominator pairs may be identified through algorithms that are generally known to those of ordinary skill in the art. An example of a dominator/immediate-post-dominator pair is provided below with respect to FIG. 4A.

IPDOM reconvergence continues after finding the dominator/immediate-post-dominator pair. Once such a pair is found, the compiler 101 inserts a dominator-hint instruction (an "SSY instruction") at the beginning of the dominator, and inserts a post-dominator-hint instruction (a ".S instruction") at the beginning of the immediate-post-dominator. Together, the SSY instruction and .S instruction enforce a constraint within the hardware wherein all threads that execute the SSY instruction execute the .S instruction together (i.e., at the same time). This constraint effectively prevents serialized execution of the node associated with the .S instruction. More specifically, because all threads execute the instructions in the node associated with the .S instruction together (at the same time), those threads do not diverge. Consequently, the threads do not execute these instructions in a serialized manner. By not executing these instructions in a serialized manner, the capabilities of the execution units 202 in the SM 310 are more efficiently utilized than if these instructions were executed in a serialized manner.

FIG. 4A through 7B illustrate various thread execution orders. The particular thread execution orders shown are exemplary only and are not intended to limit the scope of the present invention in any way. Various embodiments may implement different execution orders than those illustrated and described herein.

Figure 4A:
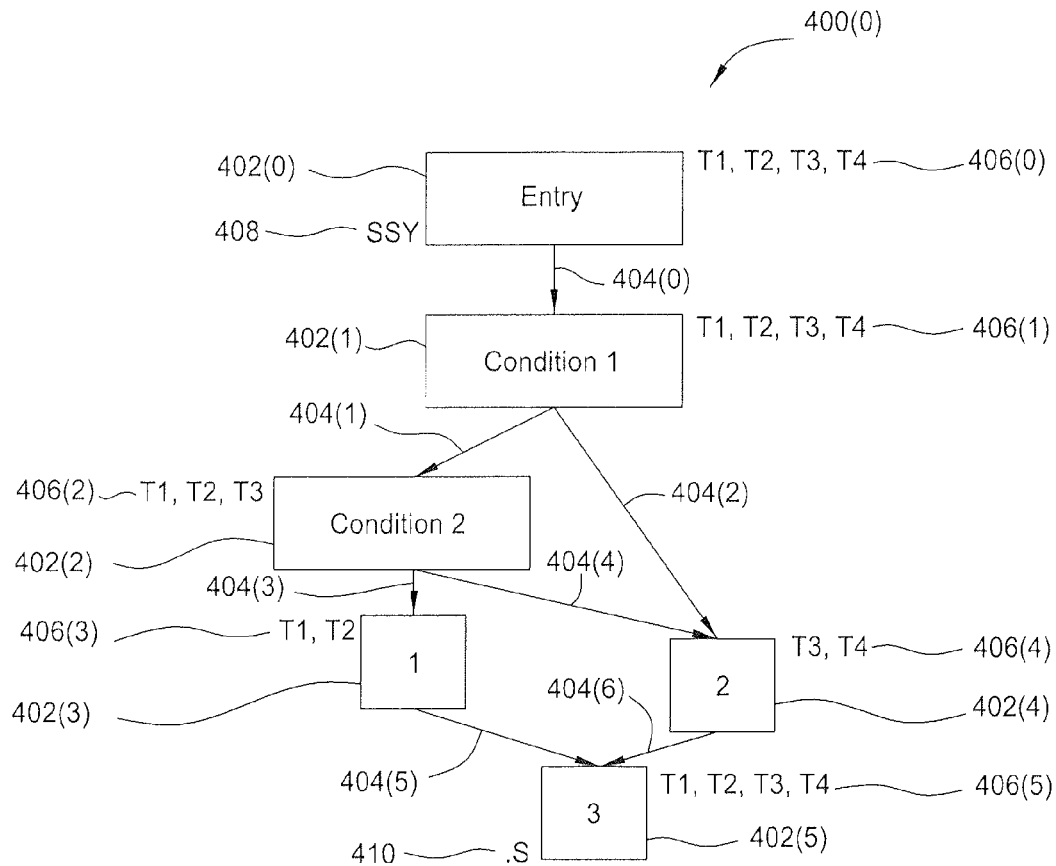
FIG. 4A illustrates a control flow graph corresponding to a section of code for which an IPDOM reconvergence optimization has been performed, according to one embodiment of the present invention.

FIG. 4A illustrates a control flow graph 400(0) corresponding to a section of code for which an IPDOM reconvergence optimization has been performed, according to one embodiment of the present invention. As shown, the control flow graph 400(0) includes nodes 402, control flow arrows 404, thread execution identifiers 406, an SSY instruction 408, and a .S instruction 410. FIG. 4A also includes a thread execution table 420(0) that illustrates the order of execution of the various nodes 402 by the different threads.

Nodes 402 may either be convergent, meaning that the node 402 includes only a single exit point (such as node 402(0)), or divergent, meaning that the node 402 includes more than one exit point (such as node 402(1)). All threads that enter a convergent node 402 together exit that node 402 together and proceed to the next node 402, which is identified by a control flow arrow 404. Node 402(0) is convergent. All threads that execute node 402(0) together exit that node 402(0) and flow to the next node 402(1) together. Threads that enter a divergent node 402 do not necessarily all flow to the same node 402, but instead may flow to different nodes 402. Some threads that execute node 402(1) may flow to node 402(2) and other threads that execute node 402(1) may flow to node 402(4).

Labels are provided for the nodes 402 in FIG. 4A (as well as FIGS. 4B—7A). These labels roughly indicate the "type" of the node. For example, the node 402(0) labeled "entry" is an entry point to the control flow graph 400(0). The node 402(1) and the node 402(2) are labeled "condition 1" and "condition 2," respectively, which indicates that these nodes 402 include conditional branches. The node 402(3), the node 402(4), and the node 402(5) are simply labeled with numerals. The nodes 402 labeled with numerals are generic nodes and may include any type of instructions, including instructions that are not directly related to control flow and are simply executed by SM 310. Other labels are used throughout the figures and are discussed in more detail below.

Thread execution identifiers 406 identify threads that execute particular nodes 402, for a particular execution of the program represented by control flow graph 400(0). Thread execution identifier 406(0) indicates that threads T1, T2, T3, and T4 execute node 402(0). Similarly, thread execution identifier 406(3) identifies that threads T1 and T2 execute node 402(3). The thread execution identifiers only identify threads that execute the various nodes 402 at some point in time, and do not necessarily identify which threads execute the various nodes 402 together. Information regarding the timing of when threads execute the various nodes 402 is provided in table 420(0). The thread execution identifiers 406 depicted in FIG. 4A are associated with a particular set of input data, and thus with a particular execution of the program associated with control flow graph 400(0). This particular set of input data produces certain results for the conditional branches (or other instructions that cause control flow divergence), which leads to the particular order of execution depicted in FIG. 4A. However, with other sets of input data, threads may execute the program associated with the control flow diagram 400(0) in a different order. In some instances, no threads may take particular branch paths, because no threads include data that cause those threads to evaluate a particular conditional branch such that the thread executes those particular branch paths.

A compiler 101 has already performed IPDOM reconvergence analysis for the control flow graph 400(0). The compiler 101 has determined that a dominator/immediate-post-dominator pair exists in control flow graph 400(0). The dominator is the condition 1 node 402(1) and the immediate-post-dominator is the "3" node 402(5). In accordance with this analysis, the compiler 101 has inserted the SSY instruction before the condition 1 node 402(1) and has inserted the .S instruction before the "3" node 402(5). Because this optimization has been performed by the compiler 101, threads reconverge at the "3" node 402(5) and thus execute that node 402(5) together.

Thread execution table 420(0) illustrates the order of execution by the different threads of the program represented by control flow graph 400(0). Each row of the thread execution table 420 is associated with a different execution time slot. Threads that execute instructions within a particular execution time slot generally execute those instructions at approximately the same time. Further, in thread execution table 420, time proceeds from top to bottom. Thus, instructions executed in a row at the top of the thread execution table 420 execute before instructions executed in a row at the bottom of the thread execution table 420.

Initially, all threads execute the entry node 402(0) and the condition 1 node 402(1). Thus, the table entries for all four threads (T1, T2, T3, and T3) corresponding to both the "Entry" and "Condition 1" rows include the letter "E" for execute. The condition 1 node 402(1) is a divergent node 402. Therefore, threads that execute the condition 1 node 402(1) may diverge to either the condition 2 node 402(2) or node "2" 402(4). Because threads may only execute at the same time if they are executing the same instruction, these divergent control flow paths are executed at different times.

The first control flow path that is executed begins with the condition 2 node 402(2). Thread T1, thread T2, and thread T3 all execute the condition 2 node 402(2). Thus, the row corresponding to Condition 2 includes the letter "E" for each of threads T1, T2, and T3, indicating that those threads execute the condition 2 node 402(2). Further, the row corresponding to Condition 2 includes the character "-" for thread T4, indicating that this thread does not execute the condition 2 node 402(2).

The condition 2 node 402(2) is also a divergent node 402. Thus, threads that execute the condition 2 node 402(2) may diverge and proceed to either node "1" 402(3) or node 2 402(4). Two thread—thread T1 and thread T2—from the condition 2 node 402(2) proceed to node "1" 402(3), and one thread T3 proceeds to the node "2" 402(4). Because thread execution is serialized, execution of threads T1 and T2 on node "1" 402(3) occurs first, and then execution of thread T3 on node "2" 402(4) occurs, as indicated in the row of the thread execution table 420(0) labeled "1" and the first row of the thread execution table 420(0) labeled "2".

Generally speaking, thread execution progresses in program-flow order. In other words, the SM 310 executes a particular thread or set of threads in the order specified by the various control flow instructions encountered by those threads. The SM 310 may stop executing particular threads and begin executing other threads for various reasons. However, in general, the SM 310 does not frequently switch between threads unless the SM 310 encounters a specific reason to switch.

One specific reason to switch threads occurs when the SM 310 encounters a .S instruction 410, which causes the SM 310 to wait until all threads have proceeded to the node 402 associated with the .S instruction 410 until executing that node 402. In the control flow graph 400(0) depicted in FIG. 4A, a .S instruction is associated with node "3" 402(5). Thus, the SM 310 does not execute node "3" 402(5) until all threads have proceeded to node "3" 402(5). When a particular thread or set of threads encounters the .S instruction 410, and not all threads have encountered that .S instruction 410, the SM 310 stops executing that thread and begins executing other threads. Thus, when threads T1 and T2 encounter the .S instruction 410, the SM 310 stops executing the thread T1 and T2, and begins executing another thread.

In general, the SM 310 is not necessarily constrained as to which thread to begin executing next when the SM 310 switches from executing one set of threads to executing another set of threads. In the particular execution flow depicted in FIG. 4A, the SM 310 begins executing thread T3 when the SM 310 switches away from executing threads T1 and T2. Because thread T3 has previously executed the condition 2 node 402(2), and has branched to node "2" 402(4), the SM 310 executes the node "2" 402(4) for thread T3, which is indicated in the first row of the thread execution table 420(0) labeled with the numeral "2." After executing the node "2" 402(4) for thread T3, thread T3 proceeds to the node "3" 402(5). However, because not all threads have encountered the .S instruction 410, the SM 310 again switches to another thread—T4. Thread T4 has previous executed the condition 1 node 402(1) and has branched from this node 402(1) to node "2" 402(4). Therefore, the SM 310 executes the node "2" 402(4) for thread T4, which is indicated with the second row of the thread execution table 420(0) labeled with the numeral "2." After executing the node "2" 402(4) for thread T4, the SM 310 encounters the .S instruction 410. At this point, all threads have arrived at the .S instruction 410. Therefore, these threads can reconverge. As indicated by the row of the thread execution table 420(0) labeled "3," each of threads T1, T2, T3, and T4 execute node "3" 402(5) together.

Note that the SM 310 executes node "2" 402(4) twice— once for thread T3 and once for thread T4. This "double-execution" is caused by the particular order in which the SM 310 executes the various threads, and because the SM 310 usually does not have specific knowledge regarding when to converge threads that have diverged. With the IPDOM reconvergence optimization described above, the SM 310 reconverges threads when the SM 310 encounters a .S instruction 410. Thus, in FIG. 4A, node "3" 402(5) is executed only once. Without the IPDOM reconvergence optimization, the SM 310 may instead have executed node "3" 402(5) more than once, thus increasing total execution time.

Figure 4B:
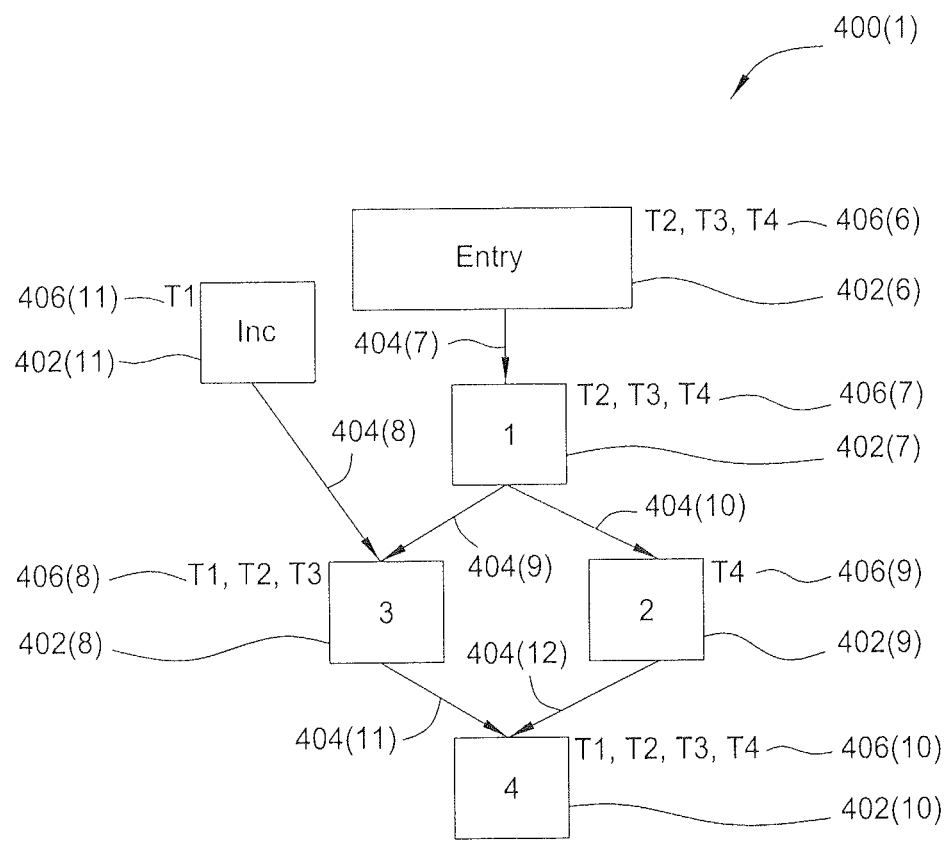
FIG. 4B illustrates a control flow graph corresponding to another section of code for which IPDOM reconvergence has not been performed, according to one embodiment of the present invention.

FIG. 4B illustrates a control flow graph 400(1) corresponding to another section of code for which IPDOM reconvergence has not been performed, according to one embodiment of the present invention. As shown, the control flow graph 400(1) includes nodes 402, control flow arrows 404, and thread execution identifiers 406. FIG. 4B also includes a thread execution table 420(1) that illustrates the order of execution of the various nodes 402 for the different threads.

Although IPDOM reconvergence optimization can help to reduce the number of times nodes 402 are executed by SM 310, IPDOM convergence optimization is generally not applicable when a dominator/immediate-post-dominator pair cannot be identified for a particular group of instructions. For the control flow graph 400(1) depicted in FIG. 4B, no dominator/immediate-post-dominator pair exists because of incoming node "Inc" 402(11). Node "4" 402(10) does not post-dominate the "entry" node 402(6) because some threads that execute node "4" 402(10) may execute node "Inc" 402(11). Such threads would not be able to execute the "entry" node 402(6). For this reason, IPDOM reconvergence optimization produces no benefit for the control flow graph 400(1) depicted in FIG. 4B.

More specifically, as indicated by thread execution table 420(1), a first thread, T1, executes the "Inc" node 402(11), and then proceeds to execute the node "3" 402(8) and the node "4" 402(10). Subsequently, thread T1, thread T2, and thread T3 execute the "entry" node 402(6) and the "1" node 402(7), which is divergent. Thread T2 and thread T3 flow to and execute node 402(8) and then execute node 402(10). Finally, thread T4 flows to and executes node "2" 402(9) and node "4" 402(10). Because no IPDOM reconvergence optimization is possible in the example control flow graph 400(1), node "4" 402(10) is executed three times. If IPDOM reconvergence had instead been possible, then node "4" 402(10) would be executed only once. Further, if node "4" 402(10) is a computationally intensive node 402, then reducing the number of times that node "4" 402(10) is executed would produce benefits in terms of increased processing performance.

Figure 5A:
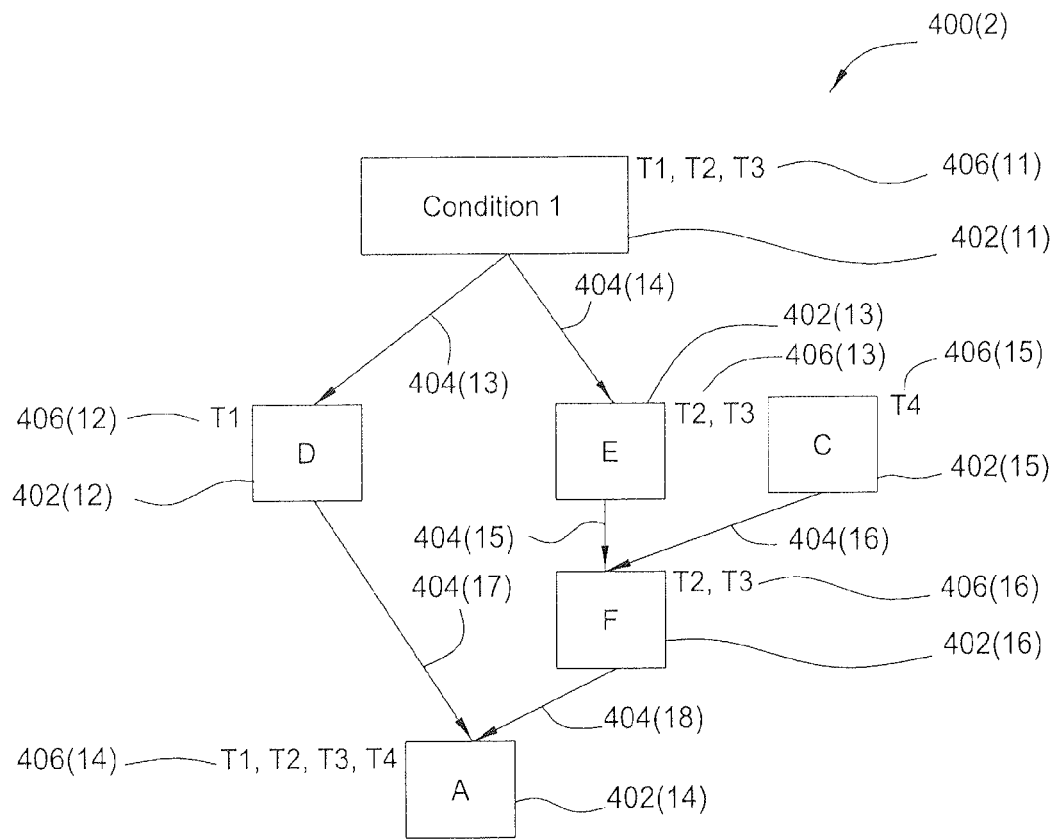
FIG. 5A illustrates a control flow graph corresponding to a section of code for which IPDOM reconvergence has not been performed, according to another embodiment of the present invention.
Figure 5B:
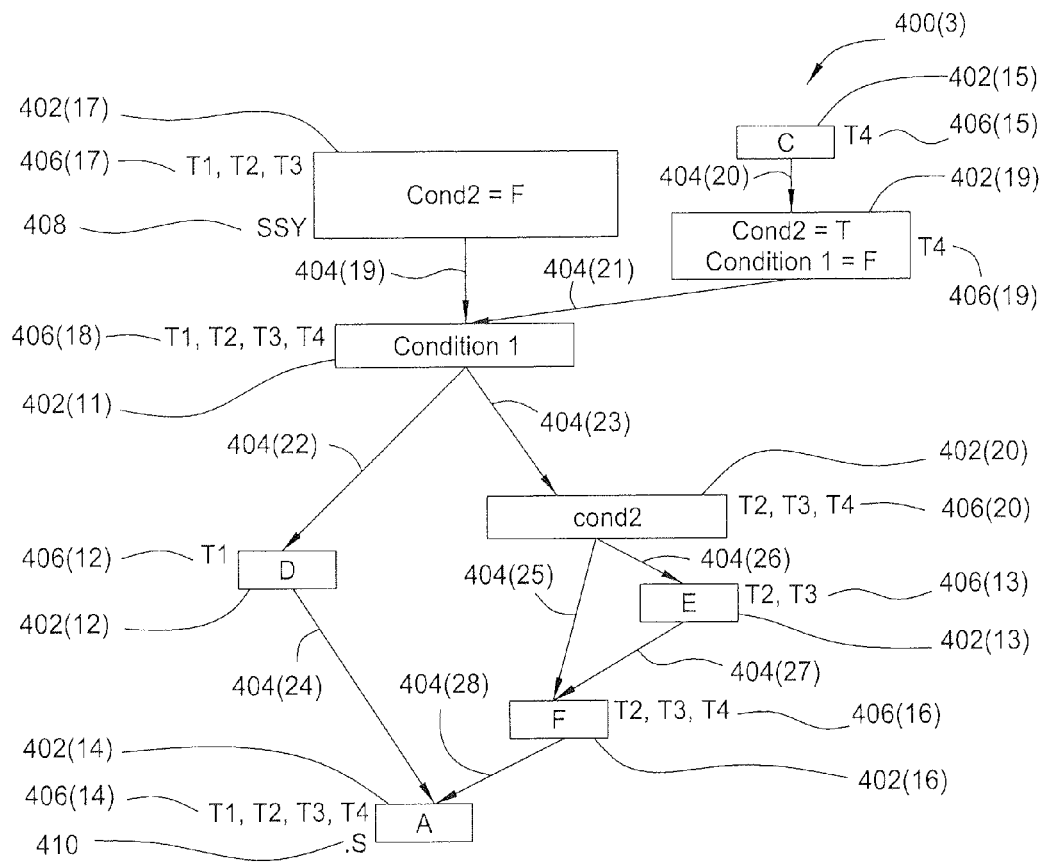
FIG. 5B illustrates a control flow graph corresponding to the section of code described with respect to FIG. 5A for which both confluence analysis optimization and IPDOM reconvergence optimization have been performed, according to one embodiment of the present invention.
Figure 6A:
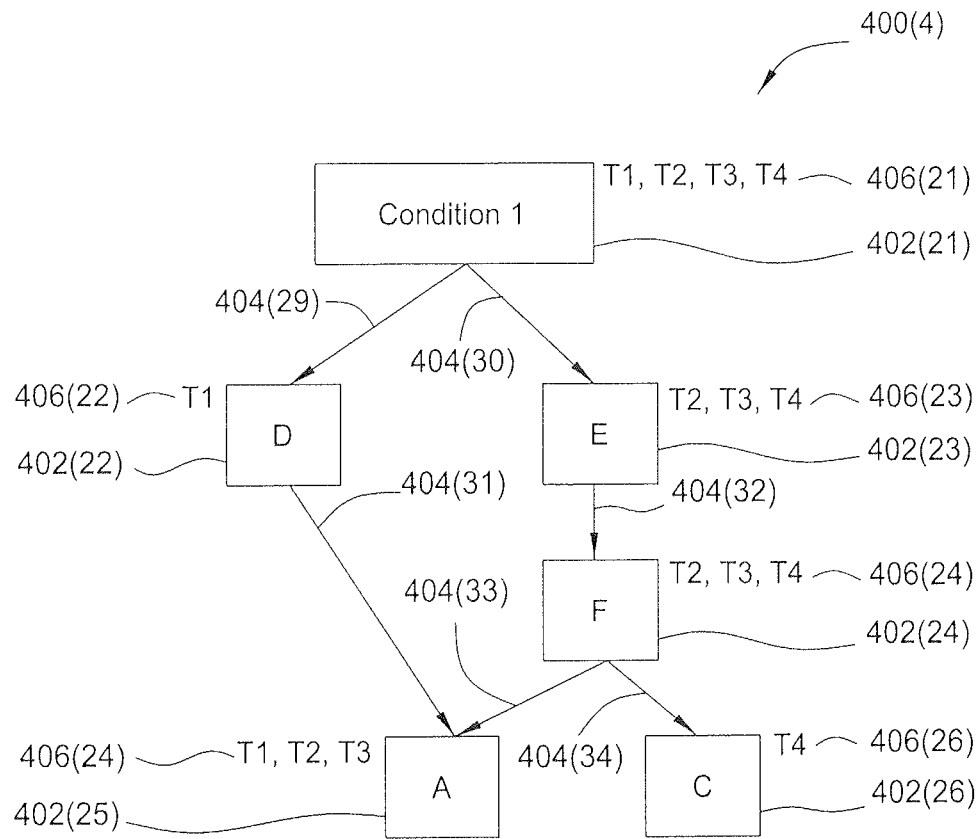
FIG. 6A illustrates a control flow graph corresponding to a section of code for which IPDOM reconvergence has not been performed, according to another embodiment of the present invention.
Figure 6B:
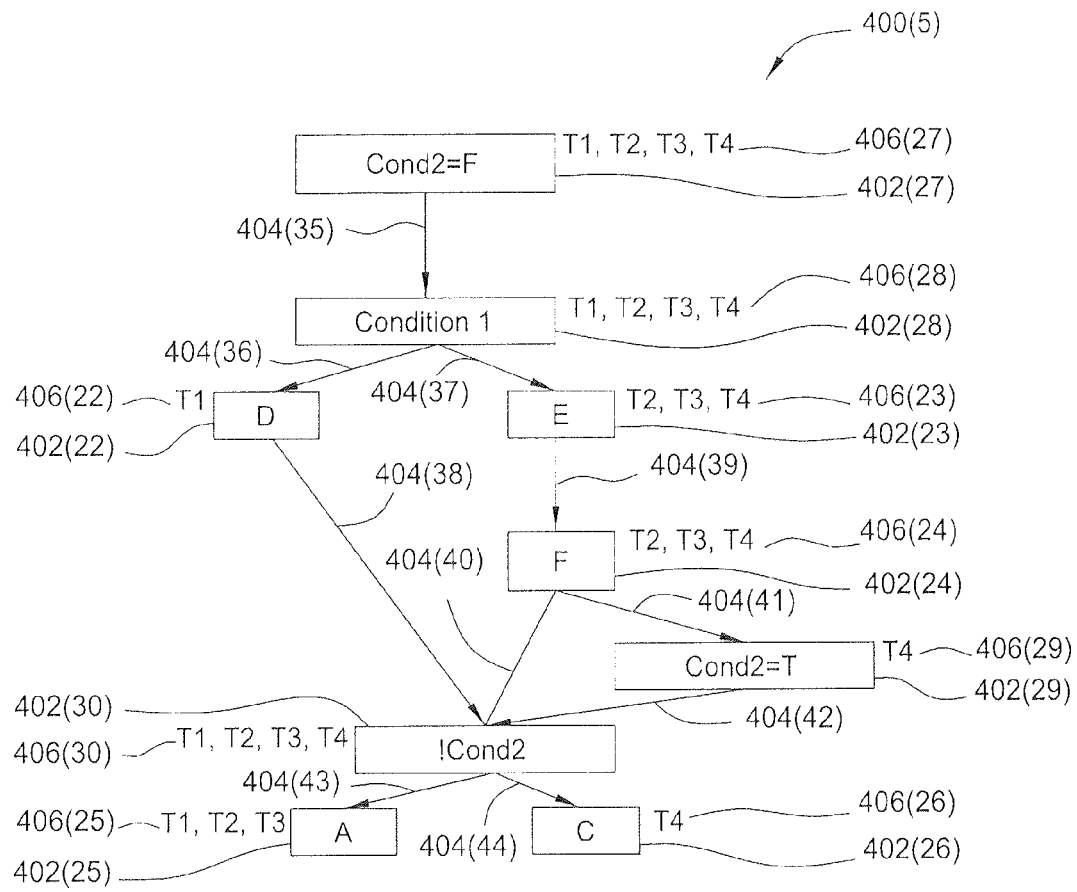
FIG. 6B illustrates a control flow graph corresponding to the section of code described with respect to FIG. 6A for which both confluence analysis optimization and IPDOM reconvergence optimization have been performed, according to one embodiment of the present invention.

As described above, IPDOM reconvergence may produce processing performance benefits when a dominator/immediate-post-dominator pair exists. However, in some situations, dominator/immediate-post-dominator pairs do not exist. Several compiler transformation techniques, referred to herein as "confluence optimization transformations" are now described that create dominator/immediate-post-dominator pairs in situations where such pairs do not exist. FIGS. 5A and 5B illustrate an example of a confluence optimization transformation in which a control flow graph to be optimized includes an incoming node. FIGS. 6A and 6B illustrate an example of a confluence optimization transformation in which a control flow graph to be optimized includes an outgoing node. Outgoing nodes and incoming nodes may be referred to herein collectively as "external nodes."

In general, confluence optimization transformations may be applied to optimize the execution of a "candidate node," (also referred to herein as a "target node") which is a node that has certain properties that are amenable to being optimized. One such property is that the candidate node consumes a lot of processing time. Reducing the number of times that such a node 402 is executed thus reduces overall execution time. In general, confluence optimization may be performed when the following conditions are met: a divergent node 402 exists; there are at least two execution paths from the divergent node 402 to another node 402; and, either the other node is not a post-dominator of the divergent node or the divergent node is not a dominator of the other node. A compiler 101 identifies candidate nodes for optimization based on execution time of those nodes and checks these conditions to determine whether confluence optimization may be performed.

FIG. 5A illustrates a control flow graph 400(2) corresponding to a section of code for which IPDOM reconvergence has not been performed, according to another embodiment of the present invention. As shown, the control flow graph 400(2) includes nodes 402, control flow arrows 404, and thread execution identifiers 406. FIG. 5A also includes a thread execution table 420(2) that illustrates the order of execution of the various nodes 402 for the different threads.

With the control flow graph 400(2), IPDOM reconvergence cannot be performed because of incoming node "C" 402(15). Because IPDOM reconvergence is not performed, threads do not necessarily reconverge in control flow graph 400(2). In the particular order of execution depicted in thread execution table 420(2), thread T1, thread T2 and thread T3 execute the condition 1 node 402(11), which is divergent. Thread T1 executes node "D" 402(12), and then executes node "A" 402(14). Because IPDOM reconvergence is not performed, threads do not reconverge at node "A" 402(14). Subsequently, thread T2 and thread T3 execute node "E" 402(13), node "F" 402(16), and node "A" 402(14). Finally, thread T4 executes node "C" 402(15), node "F" 402(16), and node "A" 402(14). Node A 402(14) is executed three times in this illustrated order of execution. Introducing a dominator/immediate-post-dominator pair where node "A" 402(14) is the immediate post-dominator of another node would cause node "A" 402(14) to be executed only once. Such dominator/immediate-post-dominator pair may be created with "confluence analysis optimization," which is now described with respect to FIG. 5B.

FIG. 5B illustrates a control flow graph 400(3) corresponding to the section of code described with respect to FIG. 5A for which both confluence analysis optimization and IPDOM reconvergence optimization has been performed, according to one embodiment of the present invention. As shown, the control flow graph 400(3) includes nodes 402, control flow arrows 404, and thread execution identifiers 406. FIG. 5B also includes a thread execution table 420(3) that illustrates the order of execution of the various nodes 402 for the different threads.

Referring to FIGS. 5A and 5B together, confluence analysis optimization is now described for the situation in which a section of code to be optimized includes an incoming node 402. As described above, confluence analysis optimization begins when a compiler 101 detects a candidate node for optimization and a divergent node. In FIG. 5A, the candidate node is node "A" 402(14) and the divergent node is node condition 1 402(11). As described above, node "A" 402(14) does not post-dominate node condition 1 402(11) because some threads that execute node "A" 402(14) do not necessarily execute node condition 1 402(11).

Once the divergent node and the candidate node are identified, the compiler 101 transforms the code to perform the confluence analysis transformation. To transform the code for the confluence analysis transformation, the compiler 101 converts the identified divergent node 402 into two different nodes 402. In the first node 402, an instruction to set a first new predicate variable (referred to as "Cond2" in FIG. 5B) to false for all of the threads that execute the first node 402. A predicate variable is a variable that includes a bitmask where each bit corresponds to a different thread. A thread that executes an instruction that writes a value to a predicate variable writes only to the bit associated with that thread. If a branch is conditional on a predicate variable, then threads for which the corresponding bit is true are said to "take" the branch (and follow a branch-taken path) and threads for which the corresponding bit is false are said to "not take" the branch (and follow a branch-not-taken path).

The compiler 101 also transforms the incoming node 402 to include a statement that sets the first new predicate variable ("Cond2") to be equal to true for all threads that execute the incoming node 402. The compiler also includes a statement that sets the predicate variable for the divergent node ("Condition 1") to be equal to fals for all threads that execute the incoming node 402. The compiler 101 modifies the incoming node 402 so that the incoming node flows next to the divergent node 402(11) rather than to the original node that the incoming node 402 flowed to. The compiler 101 also inserts a new conditional branch with a condition being equivalent to the value stored in the second new predicate variable, on the branch path from the divergent node through which the incoming node 402 flowed. This new conditional branch is configured such that threads that evaluate as "true" flow to the node that the incoming node 402 originally flowed to, and threads that evaluate as "false" flow to the node that the divergent node originally flowed to. Once the confluence analysis has been performed as described, IPDOM reconvergence analysis is applied to cause threads to reconverge at the generated immediate post-dominator.

FIG. 6A illustrates a control flow graph 400(4) corresponding to a section of code for which IPDOM reconvergence has not been performed, according to another embodiment of the present invention. As shown, the control flow graph 400(4) includes includes nodes 402, control flow arrows 404, and thread execution identifiers 406. FIG. 5A also includes a thread execution table 420(4) that illustrates the order of execution of the various nodes 402 for the different threads.

With the control flow graph 400(4), IPDOM reconvergence cannot be performed because of outgoing node "C" 402(26). The existence of outgoing node "C" 402(26) means that neither node "A" 402(25) nor node "C" 402(26) post-dominate any other node in control flow graph 400(4), since threads from node condition 1 402(21) may proceed to either node "A" 402(25) or node "C" 402(26). Because IPDOM reconvergence is not performed, threads do not necessarily reconverge in control flow graph 400(4). In the particular order of execution depicted in thread execution table 420(4), thread T1, thread T2, thread T3, and thread T4 execute the condition 1 node 402(21), which is divergent. Thread T1 executes node "D" 402(22) and then executes node "A" 402(25). Subsequently, thread T2, thread T3, and thread T4 execute node "E" 402(23) and node "F" 402(24). Since node "F" 204(24) is a divergent node 402, some threads may proceed to node "A" 402(25) and some threads may proceed to node "C" 402(26). In the particular order of execution depicted in thread execution table 402(4), thread T2 and thread T3 execute node "A" 402(25), and thread T4 executes node "C" 402(26). As shown, node "A" 402(25) is executed twice—once for thread T1 and another time for thread T2 and thread T3.

FIG. 6B illustrates a control flow graph 400(5) corresponding to the section of code described with respect to FIG. 6A for which both confluence analysis optimization and IPDOM reconvergence optimization have been performed, according to one embodiment of the present invention. As shown, the control flow graph 400(5) includes nodes 402, control flow arrows 404, and thread execution identifiers 406. FIG. 6B also includes a thread execution table 420(5) that illustrates the order of execution of the various nodes 402 for the different threads.

Referring to FIGS. 6A and 6B together, confluence analysis optimization is now described for the situation in which a section of code to be optimized includes an outgoing node 402. As described above, confluence analysis optimization begins when a compiler 101 detects a candidate node for optimization and a divergent node. In FIG. 6A, the candidate node is node "A" 402(25) and the divergent node is node Condition 1 402(21). As described above, node "A" 402(25) does not post-dominate node condition 1 402(21) because some threads that execute node "A" 402(25) do not necessarily execute node condition 1 402(21).

Once the compiler 101 identifies the divergent node and the candidate node, the compiler 101 transforms the code for the confluence analysis transformation. To transform the code for the confluence analysis transformation, the compiler 101 inserts an instruction prior to the divergent node 402(21) that sets a new predicate variable (Cond2 in FIG. 6B) to false ("Cond2=F"). The compiler 101 also identifies the outgoing divergent node 402 ("outgoing-divergent node"). The outgoing-divergent node 402 is the divergent node 420 in the control flow graph 400(4) from which the outgoing node 402 flows. In FIG. 6A, the outgoing-divergent node 402 is node "F" 402(24), since outgoing node 402 "C" flows from node "F" 402(24).

Once the compiler 101 identifies the outgoing-divergent node 402, the compiler 101 adds two new nodes 420 to the control flow graph 400(4). One node 402 that is added and is referred to herein as the "outgoing-true node." The outgoing-true node sets the new predicate variable to true for the threads that execute the outgoing-true node. In the control flow graph 400(5), the outgoing-true node is node 402(29), which includes the label "Cond2=T." The outgoing-true node is added to either the branch-taken target or the branch-not taken target of the outgoing-divergent node 402, depending on whether the outgoing node extends from the branch-taken target or the branch-not-taken target. More specifically, the predicate variable should be set to true for the threads that execute the outgoing node.

The compiler 101 also adds a new divergent node 402 (referred to herein as the "candidate-conditional node") at the opposite branch target of the outgoing-true node. The new divergent node 402 is added to the control flow graph 400(4) and points to both the candidate node 402 and the outgoing node 402. Further, the compiler 101 configures the outgoing-true node such that threads that execute the outgoing-true node 402 execute the candidate-conditional node. In FIG. 6B, the candidate-conditional node 402 is node "!Cond2" 402(30). The candidate-conditional node 402 includes a conditional branch instruction, where the condition of the conditional branch is the logical negation of the new predicate variable "Cond2." Since threads that do not take the outgoing node are set to "F" for this predicate variable, and threads that do take the outgoing node are set to "T" for this predicate variable, by the instructions described above, threads that proceed to the outgoing node in the untransformed code also proceed to the outgoing node in the transformed code. Similarly, threads that do not proceed to the outgoing node in the untransformed code also do not proceed to the outgoing node in the transformed code. Note that the condition of the candidate-conditional node 402 may be either the logical negation of the new predicate variable, or just the predicate variable without the logical negation. The branch targets of the candidate-conditional node 402 may be switched depending on whether the predicate variable is logically negated in the candidate-conditional node 402.

The candidate-conditional node 402 and the divergent node 402 form a dominator/immediate-post-dominator pair for which an IPDOM convergence optimization may be performed. The candidate-conditional node 402 dominates the divergent node 402 because all threads that execute the candidate-conditional node 402 execute the divergent node 402. The compiler 101 performs the IPDOM convergence optimization, inserting an SSY instruction 408 at the beginning of the divergent node and a .S instruction at the beginning of the candidate-conditional node 402. During execution, all threads execute the candidate-conditional node 402 together. Threads that execute the candidate node 402 also execute the candidate node 402 together, and threads that execute the outgoing node 402 also execute the outgoing node 402 together.

Any block of code can have the confluence analysis, for either outgoing nodes, or incoming nodes, applied multiple times until no outgoing or incoming edges exist.

Figure 7A:
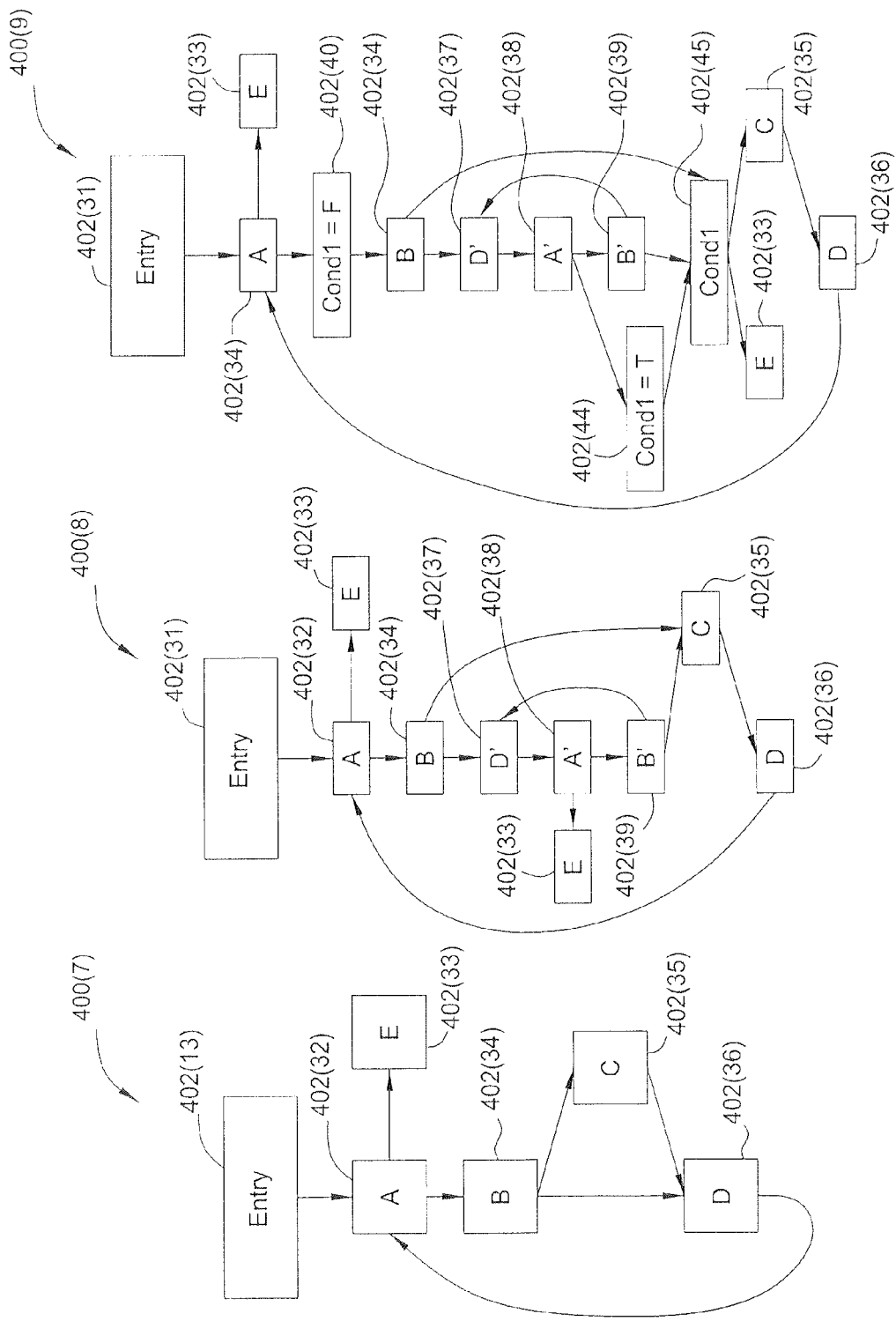
FIG. 7A depicts a sequence of control flow graphs illustrating a loop fast-forwarding operation being performed on a section of code, according to one embodiment of the present invention.
Figure 7B:
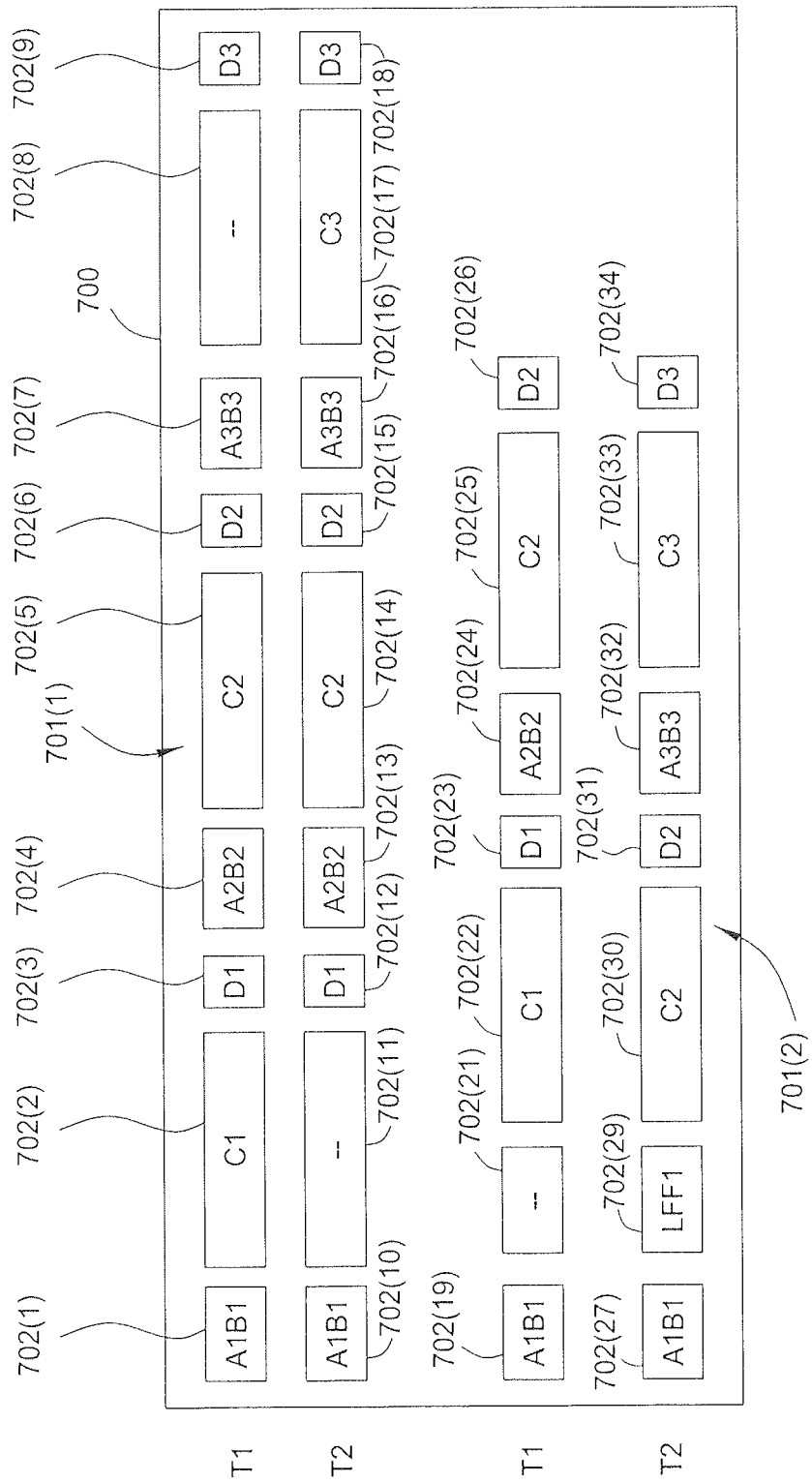
FIG. 7B is a graphical comparison between control flow graphs where loop fast-forwarding has and has not been applied, according to one embodiment of the present invention.

In addition to optimizing situations in which an incoming node or an outgoing node exist, confluence analysis may be applied, in conjunction with another type of compiler 101 transformation referred to herein as "loop fast-forwarding," to optimize the execution of loops that include divergent nodes 402. FIGS. 7A and 7B illustrate confluence analysis applied in conjunction with loop fast-forwarding to optimize execution of a loop.

FIG. 7A depicts a sequence of control flow graphs 400 illustrating a loop fast-forwarding operation being performed on a section of code, according to one embodiment of the present invention. As shown, the sequence includes a first control flow graph 400(7), a second control flow graph 400(8) illustrating a loop fast-forwarding transformation, and a third control flow graph 400(9) illustrate a confluence optimization transformation. Each control flow graph 400 includes nodes 402. Control flow arrows are depicted, but without reference numbers, for clarity.

The first control flow graph 400(7) is associated with a loop (the second control flow graph 400(8) and the third control flow graph (8) are also associated with the loop, but depict results after applying the compiler 101 transformations described herein). Control flow graph 400(7) may represent a section of code such as the following C-style pseudo-code loop:

```
for (i = 0; i < N; i++)
{
    if (a[i])
        body
    epilogue
}
```

Node "Entry" 402(13) represents code prior to the for-loop. Node "A" 402(32) represents the for-loop header ("i=0; i<N; i++"). Node "E" 402(33) represents the exit from the for-loop, which is executed for threads that do not meet the for-loop condition (i<N). Node "B" 402(34) represents the conditional statement "if(a[i])," This conditional statement is divergent because the data at a[i] may be different for each thread. Some threads therefore may evaluate the conditional statement as true, while other threads evaluate the conditional statement as false. Threads that evaluate the conditional statement as true execute the body, which corresponds to node "C" 402(35), and then proceed to the epilogue, which corresponds to node "D" 402(36). Threads that do not evaluate the conditional statement as true do not execute the body, and simply proceed to the epilogue, node 402(36). All threads that execute the epilogue 402(36) proceed back to the for-loop header, corresponding to node "A" 402(32).

The control flow graph 400(7) may have IPDOM optimization applied. The divergent node "B" 402(34) dominates node "D" 402(36), which is also the immediate-post-dominator of divergent node "B" 402(34). With IPDOM applied, threads execute each iteration of the for-loop together. However, because of the conditional if statement (divergent node "B" 402(34)), some threads may be idle while other threads execute the body (node "C" 402(35)). A more detailed discussion of this issue is provided below with respect to FIG. 7B. Advantage may be gained if the loop were altered such that fewer threads are idle while the body 402(35) is executed. The advantage would be substantial if the body is computationally heavy.

To reduce the number of threads that are idle while the body is executed, two transformations are applied. A first transformation, loop fast-forwarding, is described with respect to control flow graph 400(8) and a second transformation, confluence analysis, is described with respect to control flow graph 400(9). Although described with respect to a for-loop, persons skilled in the art will recognize that the techniques set forth herein may be applied to other types of loops.

To perform loop fast-forwarding, compiler 101 partially unrolls the loop. More specifically, compiler 101 generates a copy of several sections of the loop-epilogue copy "D'" 402(37), for-loop header copy "A'" 402(38), and divergent node copy "B'" 402(39), and inserts these copies into the control flow graph. The compiler 101 alters the original divergent node 402(32) such that the branch-not-taken path of the original divergent node 402(32) points to the epilogue copy "D'" 402(37). The branch-taken path of the original divergent node 402(32) remains pointing to the candidate node 402(35). The epilogue copy "D'" 402(37) is not divergent and includes a control flow arrow to for-loop header copy "A'" 402(38). The for-loop header copy "A'" 402(38) is divergent. The branch-taken path of the for-loop header copy "A'" 402(38) points to the divergent node copy "B'" 402(39), and the branch-not-taken path of the for-loop header copy "A'" 402(38) points to the exit block 402(33). Finally, the branch-taken path of the divergent node copy 402(39), points to the body "C" 402(35), while the branch-not-taken path of divergent node copy 402(39) points to the epilogue copy "D'" 402(37).

When executed, threads that follow the branch-not-taken path of the divergent node "B" 402(34) are "fast-forwarded." More specifically, these threads execute the for-loop header copy "A'" 402(38) until these threads either reach an iteration of the loop for which the body "C" 402(35) is to be executed, or exit the for loop at exit block 402(33). As shown, these threads also execute the epilogue copy 402(37) and the divergent node copy 402(39) as well.

With only the loop fast forwarding transformation, threads are not guaranteed to execute the body "C" 402(35) together. This is because no dominator/immediate-post-dominator pair exists. The exit block "E" 402(33) is an outgoing node 402 that prevents the body block "C" 402(35) from being considered a post-dominator. However, after a loop has had loop fast-forwarding applied, confluence analysis can be applied to create a dominator-post-dominator pair "targeting" the body, which allows all threads to that eventually execute the body "C" 402(35) to execute the body 402(35) together. Of course, some threads may also exit the loop, in which case those threads will not execute the body 402(35).

As described above with respect to FIG. 6B, to perform confluence optimization with an outgoing node, compiler 101 detects a candidate node for optimization and a divergent node. In control flow graph 400(9), the candidate node is node "C" 402(35) and the divergent node is node "B" 402(34). Node "C" 402(35) is not dominated by node "B" 402(34) because some threads that execute node "B" 402 (34) do not necessarily execute node "C" 402(35).

Compiler 101 inserts an instruction prior to the divergent node 402(34) that sets a new predicate variable (Cond1) to false ("Cond1=F"). Compiler 101 also identifies the outgoing outgoing-divergent node, which is node "A'"402(38). Compiler 101 adds two new nodes to the control flow graph 400(9). The first is the outgoing-true node 402(44), which sets the new predicate variable to true for the threads that execute the outgoing-true node. Compiler 101 also adds candidate-conditional node 402(45) that points to both the candidate node "C" 402(35) and the outgoing node "E" 402(33). The condition of candidate-conditional node 402 (45) is the variable "Cond1." Compiler 101 configures the candidate-conditional node 402(45) such that threads that execute the candidate-true node 402(44) and threads that execute the node 402(39) preceding the candidate node both flow to the candidate-conditional node 402(45).

As shown, the candidate-conditional node 402(45) is the immediate post-dominator of the divergent node, node "B" 402(34). Therefore, compiler 101 performs IPDOM convergence, inserting an SSY instruction at the divergent node and a .S instruction at the candidate node. When executed, the transformed code causes threads to execute each iteration of the loop for which the body is executed together. In any particular iteration, threads may be fast-forwarded to a different iteration of the loop, and may also exit the loop. However, threads that eventually execute the body will execute the body together.

FIG. 7B is a graphical comparison between control flow graphs depicted in FIG. 7A, where loop fast-forwarding has and has not been applied, according to one embodiment of the present invention. As shown, the graph includes a first graph 701(1) associated with control flow graph 402(7) and a second graph associated with control flow graph 402(9). Graph 701(1) and graph 701(2) each include time-blocks 702 that represent the order and amount of time with which the nodes are executed. Each graph also depicts two different threads, T1 and T2, that can execute the loop.

As first graph 701(1) illustrates, both thread T1 and thread T2 execute a first iteration of node "A" 402(32) and node "B" 402(34) together. Thread T1 evaluates the condition of node "B" 402(34) as true, but thread T2 evaluates the condition of node "B" 402(34) as false. Therefore, subsequently, execution proceeds to node "C" 402(35), where thread T1 executes node "C" 402(35) while thread T2 is idle. Subsequently, both thread T1 and thread T2 execute the epilogue 402(36) and proceed back to node "A" 402(32). Execution continues in this manner until the loop has completed, which in the example depicted in FIG. 7B is after three iterations of the loop. Node "C" 402(35) is executed by both thread T1 and thread T2 in iteration 2, but only by thread T2 in iteration 3. As shown, some efficiencies exist because node "C" 402(35), which is computationally intensive, is executed twice while only one thread is active.

As second graph 701(2) illustrates, both thread T1 and thread T2 execute a first iteration of node "A" 402(32) and a first iteration of node "B" 402(34) (as well as node Cond1=F 402(40)) together. Subsequently, thread T1, which satisfies the conditional, branches to node "C" 402(35) but does not yet execute node "C" 402(35) because of the .S instruction 410 which was included by the compiler 101 after IPDOM reconvergence. Thread T2, which does not satisfy the conditional, branches to a loop fast-forward portion, which includes node 402(34), node 402(37), node 402(38), node 402(39), and node 402(44) (as indicated by LFF in graph 701(2)) and executes the loop fast-forward portion. During execution of loop fast-forward portion, thread T1 is not active. After executing the loop fast-forward portion one time, thread T2 evaluates the branch conditional in node 402(39) as true and branches to node 402(35). Because IPDOM reconvergence analysis has been performed, SM 310 executes node "C" 402(35) for both thread T1 and T2 together. This execution together is possible even though the iterations of the loop are different, since node "C" is the same set of instructions regardless of which loop iteration is being executed.

After executing node "C" 402(35), both thread T1 and thread T2 execute node D 402(36), node "A" 402(34), node Cond1=F 402(40), and node "B" 402(34) together. Both thread T1 and thread T2 now evaluate the branch condition as true and therefore execute node "C" 402(35) together. Finally, thread T1 and thread T2 execute node "D" 402(36), node "A" 402(34), and exit the loop. As shown, the number of times that node "C" is executed is reduced with the techniques described above. If node "C" is computationally intensive, then these techniques provide processing efficiencies.

Figure 8:
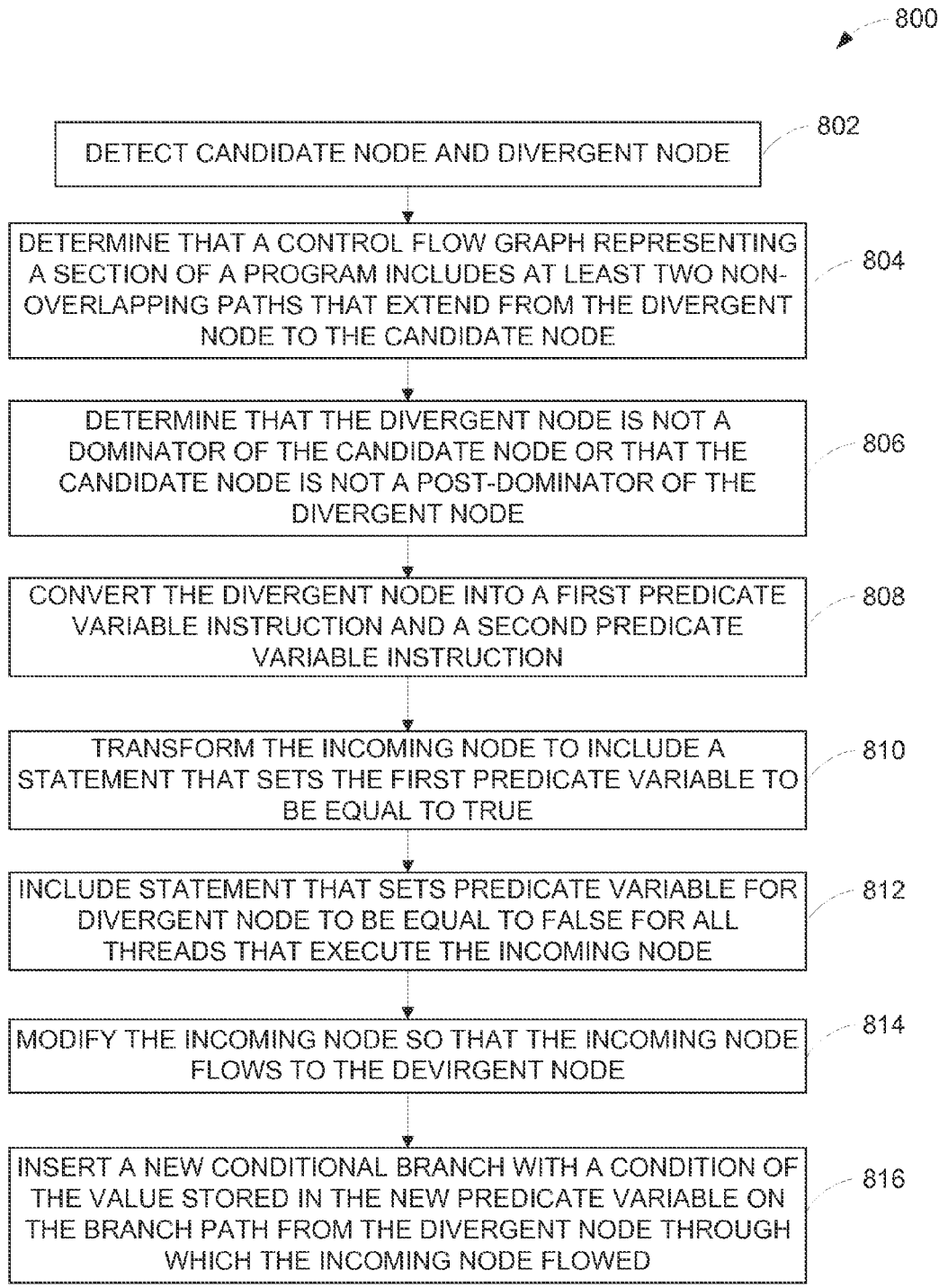
FIG. 8 is a flow diagram of method steps for performing confluence analysis on a control flow graph that includes an incoming node, according to one embodiment of the present invention.

FIG. 8 is a flow diagram of method steps for performing confluence analysis on a control flow graph that includes an incoming node, according to one embodiment of the present invention. Although the method steps are described in conjunction with FIGS. 1-7B, persons skilled in the art will understand that any system configured to perform the method steps, in any order, falls within the scope of the present invention.

As shown, a method 800 begins at step 802, wherein a compiler 101 detects a candidate node for optimization and a divergent node. In step 804, the compiler 101 determines that a control flow graph representing a section of a program includes at least two non-overlapping paths that extend from the divergent node to the candidate node. In step 806, the compiler 101 determines that the divergent node is not a dominator of the candidate node or that the candidate node is not a post-dominator of the divergent node. In step 808, the compiler 101 converts the divergent node into two different nodes. The first node is an instruction to set a first predicate variable to false for all of the threads that execute the first node. The second node sets a second predicate variable to be equal to the conditional expression for the conditional branch of the identified divergent node. In step 810, the compiler 101 transforms the incoming node to include a statement that sets the first predicate variable to be equal to true for all threads that execute the incoming node. In step 812, the compiler includes a statement that sets a predicate variable for the divergent node to be equal to false for all threads that execute the incoming node. In step 814, the compiler modifies the incoming node so that the incoming node flows next to the divergent node, rather than to the original node that the incoming node flowed to. In step 816, the compiler 101 inserts a new conditional branch with a condition being equivalent to the value stored in the second new predicate variable, on the branch path from the divergent node through which the incoming node flowed.

Figure 9:
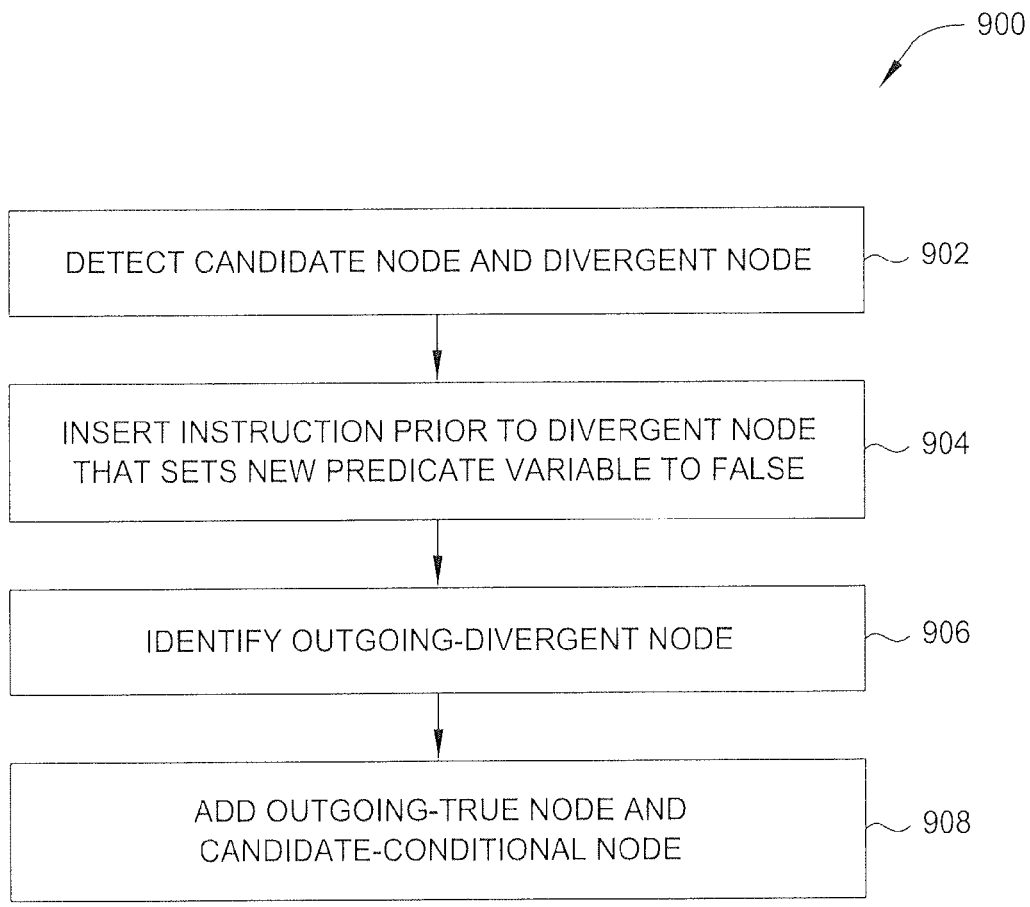
FIG. 9 is a flow diagram of method steps for performing confluence analysis on a control flow graph that includes an outgoing node, according to one embodiment of the present invention.

FIG. 9 is a flow diagram of method steps for performing confluence analysis on a control flow graph that includes an outgoing node, according to one embodiment of the present invention. Although the method steps are described in conjunction with FIGS. 1-7B, persons skilled in the art will understand that any system configured to perform the method steps, in any order, falls within the scope of the present invention.

As shown, a method 900 begins at step 902, wherein a compiler 101 detects a candidate node for optimization and a divergent node. In step 904, the compiler 101 inserts an instruction prior to the divergent node that sets a new predicate variable to false. In step 906, the compiler 101 identifies the outgoing-divergent node. In step 908, the compiler 101 adds an outgoing-true node and a candidate-conditional node to the control flow graph. The outgoing-true node sets the new predicate variable to true for the threads that execute the outgoing-true node. The new divergent node points to both the candidate node and the outgoing node. The compiler 101 configures the outgoing-true node such that threads that execute the outgoing-true node execute the candidate-conditional node.

Figure 10:
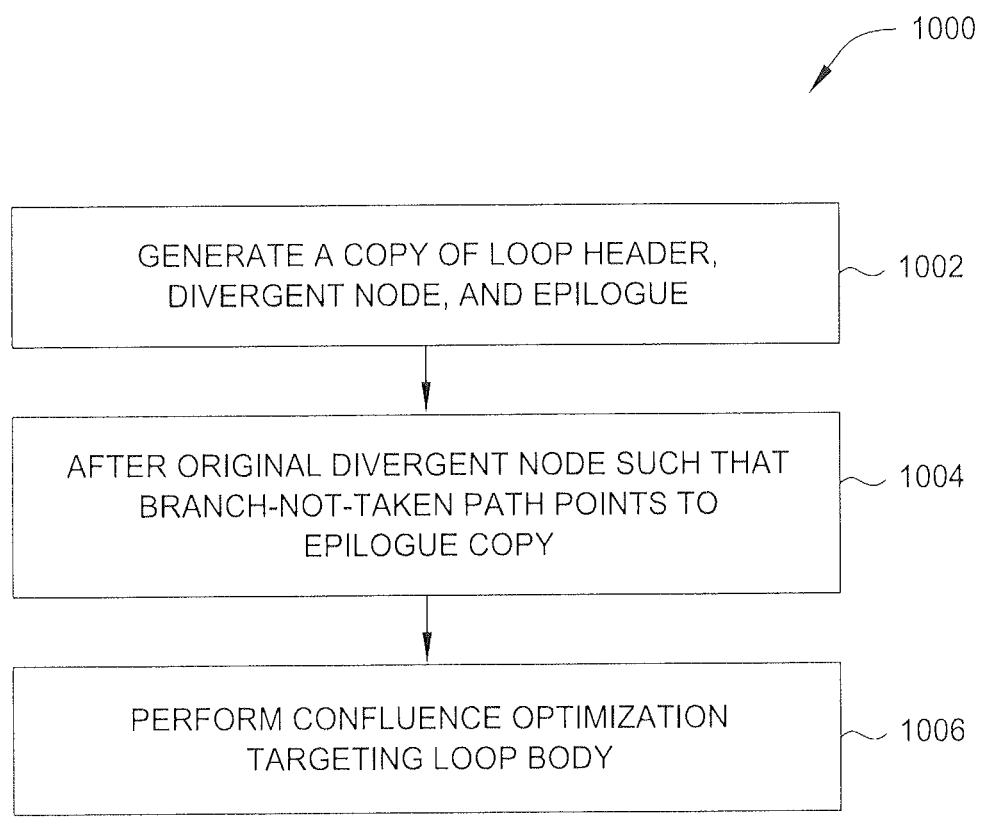
FIG. 10 is a flow diagram of method steps for performing loop fast-forwarding on a control flow graph that includes a loop, according to one embodiment of the present invention.

FIG. 10 is a flow diagram of method steps for performing loop fast-forwarding on a control flow graph that includes a loop, according to one embodiment of the present invention. Although the method steps are described in conjunction with FIGS. 1-7B, persons skilled in the art will understand that any system configured to perform the method steps, in any order, falls within the scope of the present invention.

As shown, a method 1000 begins at step 1002, wherein a compiler 101 generates a copy of a loop header, a divergent node, and an epilogue. In step 1004, the compiler 101 alters the original divergent node such that the branch-not-taken path of the original divergent node points to the epilogue copy. The branch-taken path of the original divergent node remains pointing to the candidate node. The epilogue copy is not divergent and includes a control flow arrow to for-loop header copy. The for-loop header copy is divergent. The branch-taken path of the for-loop header copy points to the divergent node copy, and the branch-not-taken path of the for-loop header copy points to the exit block. Finally, the branch-taken path of the divergent node copy, points to the body, while the branch-not-taken path of divergent node copy points to the epilogue copy. In step 1006, the compiler 101 performs confluence optimization "targeting" the loop body.

In sum, techniques are provided whereby a compiler is able to transform a control flow graph that does not have a dominator/immediate-post-dominator pair due to having either an incoming node or an outgoing node. The compiler identifies the incoming or outgoing node and generates a special predicate variable for that node. The compiler also inserts an instruction to set that special predicate variable to true for all threads that execute that node and to false for threads that do not execute that node. The compiler inserts a branch instruction with a condition equivalent to the predicate variable so that threads that execute the branch instruction execute the proper control flow path. With loop fast-forwarding, the compiler first partially unwinds a loop and then applies confluence analysis to the loop.

One advantage of the disclosed technique is that the approach allows a dominator/immediate-post-dominator pair to be created in situations in which such a pair does not exist. Creating this pair allows IPDOM reconvergence to be applied, which causes threads to reconverge at the post-dominator. Causing threads to reconverge at the post-dominator reduces the number of times that a candidate node is executed, which can reduce overall processing time, thereby improving performance. Another advantage is that the approach allows loop execution time to be reduced by allowing threads to execute a body within a divergent execution path in the loop to be executed fewer times than without loop fast-forwarding. Reducing the number of times this body executes reduces execution time of the loop, which improves processing performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for causing thread convergence in a parallel execution environment, wherein the method is implemented by a compiler executing on a processor, the method comprising:

determining, by the compiler executing on the processor, that a control flow graph representing a first section of a program includes at least two non-overlapping paths that extend from a first divergent node to a candidate node;

determining, by the compiler executing on the processor, that the first divergent node is not a dominator of the candidate node or that the candidate node is not a post-dominator of the first divergent node;

identifying, by the compiler executing on the processor, an external node in the control flow graph;

inserting into the program, by the compiler executing on the processor, a first instruction configured to cause a predicate variable to be set to true for a first set of threads that is to execute the external node; and inserting into the program, by the compiler executing on the processor, a second divergent node that is configured to cause the first set of threads to execute a first control flow path associated with the external node and to cause a second set of threads for which the predicate variable is set to false to not execute the first control flow path.

2. The computer-implemented method of claim 1, further comprising:

inserting, by the compiler executing on the processor, a dominator-hint instruction into the program proximate to the first divergent node; and inserting, by the compiler executing on the processor, a post-dominator-hint instruction into the program proximate to the candidate node.

3. The computer-implemented method of claim 1, further comprising identifying, by the compiler executing on the processor, the candidate node based an associated execution time.

4. The computer-implemented method of claim 1, wherein the external node comprises an incoming node.

5. The computer-implemented method of claim 4, further comprising:

inserting, by the compiler executing on the processor, the second divergent node into a branch path of the first divergent node, wherein at least one thread that is to execute the incoming node also executes the second divergent node.

6. The computer-implemented method of claim 5, further comprising identifying, by the compiler executing on the processor, an originally targeted node associated with the incoming node and configuring, by the compiler executing on the processor, the second divergent node to target the originally targeted node.

7. The computer-implemented method of claim 1, wherein the external node comprises an outgoing node.

8. The computer-implemented method of claim 7, further comprising:

inserting, by the compiler executing on the processor, an instruction into the program before the first divergent node, wherein the instruction sets the predicate variable equal to false for at least one thread that is to execute the first divergent node; and inserting, by the compiler executing on the processor, the second divergent node into the program prior to the candidate node.

9. The computer-implemented method of claim 8, further comprising configuring, by the compiler executing on the processor, the second divergent node to target the candidate node.

10. The computer-implemented method of claim 7, wherein the program includes a loop, and further comprising performing, by the compiler executing on the processor, a loop-fast-forward operation on a portion of the program that includes the loop.

11. A non-transitory computer-readable medium for causing thread convergence in a parallel execution environment, the non-transitory computer-readable medium including compiler instructions that, when executed by a processor, cause the processor to:

determine that a control flow graph representing a first section of a program includes at least two non-overlapping paths that extend from a first divergent node to a candidate node;

determine that the first divergent node is not a dominator of the candidate node;

identify an external node in the control flow graph;

insert into the program a first instruction configured to cause a predicate variable to be set to true for a first set of threads that is to execute the external node; and insert into the program a second divergent node that is configured to cause the first set of threads to execute a first control flow path associated with the external node and to cause a second set of threads for which the predicate variable is set to false to not execute the first control flow path.

12. The non-transitory computer-readable medium of claim 11, further including compiler instructions that, when executed by the processor, cause the processor to:

insert a dominator-hint instruction into the program proximate to the first divergent node; and insert a post-dominator-hint instruction into the program proximate to the candidate node.

13. The non-transitory computer-readable medium of claim 11, further including compiler instructions that, when executed by the processor, cause the processor to identify the candidate node based an associated execution time.

14. The non-transitory computer-readable medium of claim 11, wherein the external node comprises an incoming node.

15. The non-transitory computer-readable medium of claim 14, further including compiler instructions that, when executed by the processor, cause the processor to:

convert a first condition associated with the first divergent node into a second condition that evaluates a logical OR of the predicate variable and the first condition; and insert the second divergent node into a branch path of the first divergent node, wherein at least one thread that is to execute the incoming node also executes the second divergent node.

16. The non-transitory computer-readable medium of claim 11, wherein the external node comprises an outgoing node.

17. The non-transitory computer-readable medium of claim 16, further including compiler instructions that, when executed by the processor, cause the processor to:

insert an instruction into the program before the first divergent node, wherein the instruction sets the predicate variable equal to false for at least one thread that is to execute the first divergent node; and insert the second divergent node into the program prior to the candidate node.

18. The non-transitory computer-readable medium of claim 17, wherein the program includes a loop, and further comprising compiler instructions that, when executed by the processor, cause the processor to perform a loop-fast-forward operation on a portion of the program that includes the loop.

19. A computing device for causing thread convergence in a parallel execution environment, the computing device comprising:
- a memory including a compiler; and
- a processor coupled to the memory, wherein, when the processor executes the compiler, the processor:
  - determines that a control flow graph representing a first section of a program includes at least two non-overlapping paths that extend from a first divergent node to a candidate node;
  - determines that the candidate node is not a post-dominator of the first divergent node;
  - identifies an external node in the control flow graph; and
  - inserts into the program a second divergent node that is configured to cause a first set of threads to execute a first control flow path associated with the external node and to cause a second set of threads for which a predicate variable is set to false to not execute the first control flow path.

20. The computing device of claim 19, wherein the processor, when executing the compiler, performs a loop-fast-forward operation on a portion of the program that includes a loop.

* * * * *